United States Patent Office 3,698,997
Patented Oct. 17, 1972

3,698,997
PREPARATION OF L-TYROSINE BY FERMENTATION
Katsunobu Tanaka, Kazuo Ohshima, Yoh Tokoro, and Mitsuyoshi Okii, Tokyo-to, Japan, assignors to Kyowa Hakko Kogyo Kabushiki Kaisha, Tokyo-to, Japan
No Drawing. Filed Mar. 28, 1969, Ser. No. 811,603
Claims priority, application Japan, Mar. 29, 1968, 43/20,031
Int. Cl. C12b 1/00
U.S. Cl. 195—28 R                                   7 Claims

ABSTRACT OF THE DISCLOSURE

L-tyrosine is prepared by culturing a hydrocarbon assimilable microorganism which requires phenylalanine for its growth. Microorganisms of the genera Corynebacterium, Brevibacterium, Arthrobacter, etc. are particularly suitable for use in the process.

BACKGROUND OF THE INVENTION

Prior investigators have reported that L-tyrosine can be obtained by fermentation by employing a phenylalanine-requiring mutant of *Escherichia coli* [Experientia, 6, 41 (1950)], a mutant of *Bacillus subtilis* [Amino Acids, 1, 1 (1959)] or a phenylalanine-requiring mutant of *Micrococcus glutamicus* [J. Agricultural Chem. Soc., Japan, 35, 146 (1961)]. However, all of these prior investigators reported that carbohydrates were used as raw materials.

DETAILED DESCRIPTION OF THE INVENTION

We have discovered that L-tyrosine can be obtained in large yield by culturing a microorganism in a culture medium containing suitable amounts of carbon source, nitrogen source, inorganic salts and various other nutrients when required for growth.

More particularly, we have discovered that L-tyrosine can be obtained in large yield by culturing a hydrocarbon-assimilable, amino acid producing microorganism which requires phenylalanine for its growth in a culture medium.

Microorganisms capable of producing L-tyrosine according to the process of this invention are found in various genera but particularly suitable microorganisms are members of the genera Corynebacterium, Brevibacterium, Arthrobacter, etc. Particularly suitable mutant strains of the above genera for use in the process according to this invention are derived from *Corynebacterium hydrocarboclastus*, *Brevibacterium ketoglutamicum*, *Arthrobacter paraffineus* and *Arthromacter roseoparaffinus*. All of these mutant strains require phenylalanine for their growth. They were obtained by U.V. irradiation of hydrocarbon-assimilable bacteria.

A culture of each of the mutants above has been deposited without restriction as to its being made available to the public in the American Type Culture Collection. The mutant (2438–U–8) of *Corynebacterium hydrocarboclastus* is identified as ATCC 21227; the mutant (2473–U–21) of *Brevibacterium ketoglutamicum*; the mutant (2411–U–30) of *Arthobacter paraffineus* as ATCC (21377) and the mutant (1661–U–22) of *Arthrobacter roseoparaffinus*.

As the carbon source of the culture medium, aliphatic hydrocarbons of ten (10) to twenty-five (25) carbon atoms or mixture thereof, gaseous hydrocarbons or crude hydrocarbon materials such as kerosene, gasoline, etc. may be used. Especially good results are obtained by the use of n-paraffins of eleven (11) to eighteen (18) carbon atoms.

As the nitrogen source, ammonium nitrate, ammonium chloride, ammonium sulfate, ammonium carbonate, ammonium phosphate, urea, etc. may be used.

Organic nutrients and inorganic salts are preferably added to the culture medium. As the organic nutrient, peptone, NZ-amine, meat extract, yeast extract, corn steep liquor, casein hydrolysate, fish meal or fish meal hydrolysate, soybean meal hydrolysate, etc. may be used. When a purely synthetic medium is used, it is possible to use thiamine and phenylalanine in place of such materials. As the inorganic substances, $KH_2PO_4$, $Na_2HPO_4$, magnesium sulfate, manganese sulfate, ferrous sulfate, zinc sulfate, calcium carbonate, etc. may be employed.

The cultivation is carried out under aerobic conditions such as by means of aerobic submerged or shaking culture, etc. The culturing temperature is preferably 25 to 50° C. The pH of the medium may vary but it is advantageous to adjust the pH to about neutral by using a suitable neutralizing agent such as aqueous ammonia, sodium hydroxide, ammonium carbonate, calcium carbonate, etc. Culturing is preferably conducted for 2–4 days in order to obtain a sufficient amount of L-tyrosine.

After culturing, microbial cells are removed from the broth and the filtrate is treated by a suitable method, e.g., ion exchange resin treatment, in order to yield L-tyrosine. Throughout this specification percentages denote weight per volume (w./v.) with the exception of those of carbon sources.

The following examples serve to illustrate the invention, but they are not to be considered as limiting the same.

EXAMPLE 1

Fermentation was carried out using a culture medium containing:

| | | |
|---|---|---|
| $KH_2PO_4$ | percent | 0.2 |
| $Na_2HPO_4$ | do | 0.2 |
| $MgSO_4 \cdot 7H_2O$ | do | 0.1 |
| $MnSO_4 \cdot 4H_2O$ | do | 0.005 |
| $FeSO_4 \cdot 7H_2O$ | do | 0.001 |
| $ZnSO_4 \cdot 7H_2O$ | do | 0.001 |
| $NH_4NO_3$ | do | 1 |
| Thiamine | mg./l | 1 |
| NZ-amine | percent | 0.5 |
| Mixture of n-paraffins ($C_{12}$–$C_{14}$) | v./v | 5 |

The medium was sterilized and then calcium carbonate (1%), which had been separately sterilized and dried, was added to adjust the pH of the medium to 7.0. The medium was inoculated with *Arthrobacter paraffineus* 2411–U–30 (ATCC 21377) seed culture (10% by volume) which was prepared by culturing the strain in yeast bouillon with shaking for 24 hours. Fermentation was carried out at 30° C. for 4 days with shaking. During cultivation, the pH was adjusted to about neutral by adding ammonium carbonate. Three and two tenths (3.2) mg./ml. of L-tyrosine was accumulated after cultivation was complete.

The broth was filtered to remove microbial bodies. The obtained filtrate was adjusted to pH 2, and was absorbed on Diaion SK No. 1 (strongly acidic cation exchange resin available from Mitsubishi Kasi Kogyo K.K., Japan). After washing with water, the resin was eluted with 1 N aqueous ammonia. Ninhydrin-positive fractions of the eluate were collected, combined and concentrated at 40° C. under reduced pressure. The concentrated solution was then decolorized with active carbon and alcohol was added thereto 2.6 g. of crude crystals of L-tyrosine was obtained.

EXAMPLE 2

*Arthrobacter paraffineus* 2411–U–30 (ATCC 21377) seed culture was employed and fermentation was conducted in a similar manner to that described in Example 1 with the exception that a purely synthetic medium having 500γ/ml. of L - phenylalanine instead of NZ - amine (0.5%) was employed. After completion of the fermentation, 2.8 mg./ml. of L-tyrosine was obtained.

EXAMPLE 3

A bouillon culture of *Corynebacterium hydrocarboclastus* 2438–U–8 (ATCC 21227) was used as seed culture. A similar medium to that described in Example 1 was used with the exception that the n-paraffin mixture (5% v./v.) was replaced by kerosene (5% v./v.). Fermentation by culturing with shaking for 4 days produced 1.2 mg./ml. of L-tyrosine.

EXAMPLE 4

A similar cultivation to that described in Example 1 was employed with the exception that a seed culture of *Brevibacterium ketoglutamicum* 2473–U–21 was used to produce 3.1 mg./ml. of L-tyrosine.

We claim:

1. A process of preparing L-tyrosine, comprising aerobically culturing the hydrocarbon-assimilable phenylalanine-requiring microorganism *Arthrobacter paraffineus* ATCC 21377 in a culture medium containing hydrocarbon as the main carbon source and recovering the accumulated L-tyrosine from said culture medium.

2. A process as claimed in claim 1 in which the temperature of said culture medium is maintained within the range of 25–50° C.

3. A process as claimed in claim 1 in which the pH of said culture medium is maintained at approximately 7.

4. A process as claimed in claim 1 in which culturing is continued for a period within the range of 2–4 days.

5. A process as claimed in claim 1 in which the main carbon source is an aliphatic hydrocarbon of 10–25 carbon atoms or mixtures thereof, kerosene or gasoline.

6. A process as claimed in claim 5 in which the main carbon source is a n-paraffin of 11–18 carbon atoms.

7. A process as claimed in claim 1 in which the culture medium contains a nitrogen source, inorganic material and nutrients.

References Cited

Ishii et al.: "Microbial Prod. of Amino Acids From Hydrocarbons," J. Gen. Appl. Microbiol, vol. 13, pp. 217–225, 1967.

Kyowa Ind. II: "Glutamic Acid," Chem. Abs., vol. 66, 1967.

Kyowa Ind. II: "Glutamic Acids," Chem. Abs., vol. 66, 1967.

Kyowa Ind. III: "Threonine," Chem. Abs., vol. 68, 1968.

Umbarger et al.: "The Bacteria, Pathways of Amino Acid Biosynthesis," vol. III, pp. 227–9 and 237, 1962.

A. LOUIS MONACELL, Primary Examiner

G. M. NATH, Assistant Examiner